(12) United States Patent  (10) Patent No.: US 9,191,961 B2
Jang et al.  (45) Date of Patent: Nov. 17, 2015

(54) METHOD FOR ALLOCATING WIRELESS RESOURCES IN WIRELESS ACCESS SYSTEM AND DEVICE THEREFORE

(75) Inventors: Jiwoong Jang, Anyang-si (KR); Dongguk Lim, Anyang-si (KR); Hangyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 26 days.

(21) Appl. No.: 14/126,302

(22) PCT Filed: Jun. 18, 2012

(86) PCT No.: PCT/KR2012/004784
§ 371 (c)(1),
(2), (4) Date: Dec. 13, 2013

(87) PCT Pub. No.: WO2012/173443
PCT Pub. Date: Dec. 20, 2012

(65) Prior Publication Data
US 2014/0128089 A1  May 8, 2014

Related U.S. Application Data

(60) Provisional application No. 61/497,964, filed on Jun. 17, 2011.

(51) Int. Cl.
*H04W 72/00* (2009.01)
*H04W 72/08* (2009.01)
*H04W 76/02* (2009.01)

(52) U.S. Cl.
CPC .......... *H04W 72/082* (2013.01); *H04W 76/023* (2013.01)

(58) Field of Classification Search
CPC .................... H04W 72/082; H04W 76/023
USPC ................ 455/450, 451, 452.1, 452.2
See application file for complete search history.

(56) References Cited

U.S. PATENT DOCUMENTS

| | | | |
|---|---|---|---|
| 2009/0175159 A1* | 7/2009 | Bertrand et al. | 370/203 |
| 2010/0284351 A1* | 11/2010 | Liang et al. | 370/329 |
| 2011/0066738 A1 | 3/2011 | Richardson et al. | |
| 2012/0028672 A1* | 2/2012 | Chen et al. | 455/522 |

FOREIGN PATENT DOCUMENTS

| | | | |
|---|---|---|---|
| WO | 2006/067683 A2 | 6/2006 | |
| WO | 2010/049801 A1 | 5/2010 | |

* cited by examiner

*Primary Examiner* — Wayne Cai
(74) *Attorney, Agent, or Firm* — Dentons US LLP

(57) ABSTRACT

The present invention pertains to a method for allocating wireless resources used in device-to-device communication in a wireless access system which supports device-to-device communication, and a device therefore. Specifically, the invention includes a step for receiving resource control information through a control channel from a base station during device-to-device communication of a first device and a second device, and a step for allocating wireless resources which do not interfere in the device-to-device communication of another device and the second device by using resource control information of the first device when interference with another device occurs due to device-to-device communication of the first device and the second device.

14 Claims, 4 Drawing Sheets

METHOD FOR ALLOCATING WIRELESS RESOURCES IN WIRELESS ACCESS SYSTEM AND DEVICE THEREFORE

This application is a 35 USC §371 National Stage entry of International Application No. PCT/KR2012/004784 filed on Jun. 18, 2012, and claims priority to U.S. Provisional Application No. 61/497,964, filed Jun. 17, 2011, all of which are incorporated by reference in their entirety herein.

TECHNICAL FIELD

The present invention relates to a wireless access system, and more particularly, to a method of allocating a radio resource for D2D (device-to-device) communication in a wireless access system supportive of the D2D communication and apparatus therefor.

BACKGROUND ART

In cellular communications, a user equipment existing in a cell accesses a base station to perform communication, receives control information for exchanging data from a base station, and then transceives data with the base station. In particular, since the user equipment transceives data through the base station, in order to transmit data to another cellular user equipment, the user equipment transmits its data to the base station. Having received the data, the base station transmits the received data to another user equipment. Thus, since data can be transmitted through the base station in order for one user equipment to transmit data to another user equipment, the base station performs scheduling of channels and resources for the data transceiving and also transmits channel and resource scheduling information to each user equipment. Thus, in order to perform UE-to-UE communication through the base station, each user equipment needs channel and resource allocations to transceive data with the base station. Yet, according to the structure of D2D communication, one user equipment directly transceives signals with another user equipment, to which data shall be transmitted, without using a base station or a relay node.

DISCLOSURE OF THE INVENTION

Technical Tasks

One object of the present invention is to provide a method of efficiently allocate a radio resource for D2D communication in a D2D communication supportive wireless access system and apparatus therefor.

Another object of the present invention is to provide a method of allocating a radio resource and apparatus therefor, by which interference with a neighbor cellular device or a device configured to communicate with a neighbor device can be prevented from occurring due to D2D communication.

Further object of the present invention is to provide a method of transceiving control information with a base station smoothly and apparatus therefor, by which the control information can be smoothly transceived with the base station if a device configured to perform D2D communication belongs to a different cell due to mobility of a device.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of allocating a radio resource, which is used for device-to-device (D2D) communication in a wireless access system supportive of the D2D communication, according to one embodiment of the present invention includes the steps of receiving a resource control information through a control channel from a base station while a $1^{st}$ device performs the D2D communication with a $2^{nd}$ device and if interference with a different device occurs due to the D2D communication between the $1^{st}$ device and the $2^{nd}$ device, controlling the $1^{st}$ device to allocate the radio resource configured not to cause interference with the different device for the D2D communication with the $2^{nd}$ device using the resource control information.

To further achieve these and other advantages and in accordance with the purpose of the present invention, an apparatus for allocating a radio resource, which is used for device-to-device (D2D) communication in a wireless access system supportive of the D2D communication, according to another embodiment of the present invention includes an RF (radio frequency) unit configured to transceive radio signals and a processor receiving a resource control information through a control channel from a base station while performing the D2D communication with a $2^{nd}$ device, the processor, if interference with a $3^{rd}$ device occurs due to the D2D communication with the $2^{nd}$ device, allocating the radio resource configured not to cause interference with the different device for the D2D communication with the $2^{nd}$ device using the resource control information.

Preferably, the resource control information includes at least one of a resource use information on the radio resource of a cell or sector having the D2D communication between the $1^{st}$ device and the $2^{nd}$ device performed therein, a channel quality information between the $2^{nd}$ device and the base station, a mobility information of the $2^{nd}$ device and a coordinates (position) information of the $2^{nd}$ device.

Preferably, the resource use information includes one of an information indicating whether the radio resource of the cell or the sector is used and an information indicating whether the radio resource of the cell or the sector is used for a communication with a cellular network or the D2D communication.

Preferably, the channel quality information is transmitted if the mobility information of the $2^{nd}$ device or the coordinates (position) information of the $2^{nd}$ device is changed over a predetermined level.

Preferably, the mobility information of the $2^{nd}$ device includes a moving direction information of the $2^{nd}$ device and a speed information of the $2^{nd}$ device and each of the moving direction information and the speed information is divided by steps.

Preferably, the radio resource is allocated in a manner of allocating the radio resource configured not to cause the interference with the different device using a channel quality information with the $2^{nd}$ device.

Preferably, the control channel includes one of a physical downlink control channel (PDCCH) and an enhanced physical downlink control channel (e-PDCCH) transmitted on a physical downlink shared channel (PDSCH) region.

Preferably, the control channel is transmitted in a foremost OFDM (orthogonal frequency division multiplex) symbol of a subframe.

Advantageous Effects

According to an embodiment of the present invention, a radio resource for D2D communication can be efficiently allocated in a wireless access system, and more particularly, in a D2D communication supportive wireless access system.

According to an embodiment of the present invention, interference with a neighbor cellular device or a device configured to communicate with a neighbor device can be prevented from occurring due to D2D communication.

Moreover, even if a device configured to perform D2D communication belongs to a different cell due to device mobility, control information can be smoothly transceived with a base station.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
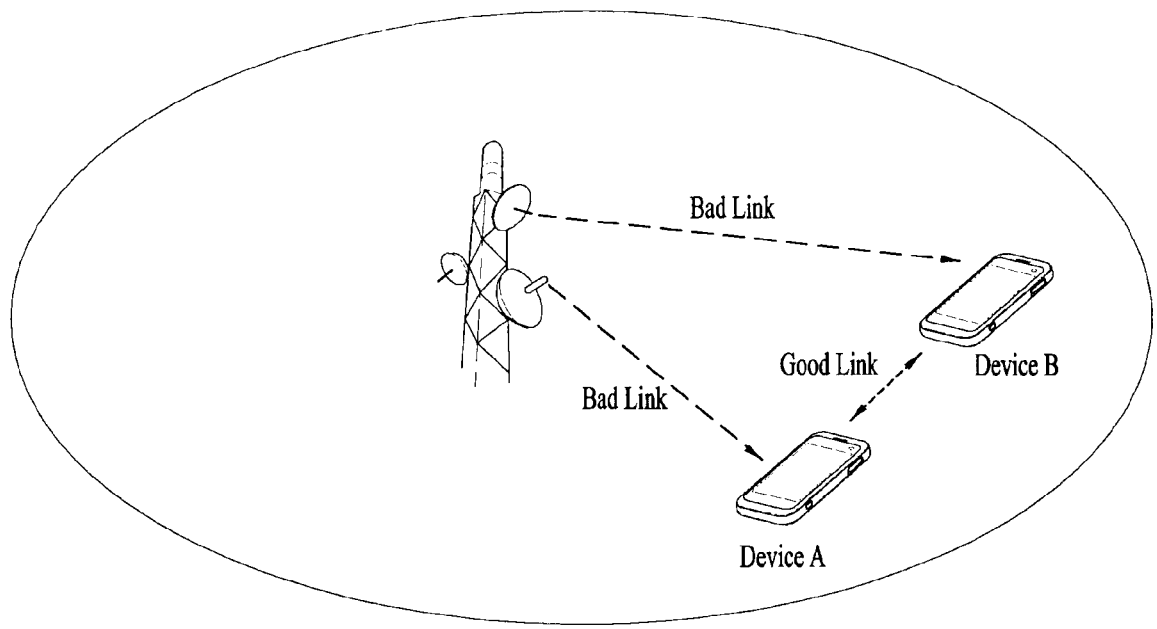
FIG. 1 shows one example that D2D communication is performed between two D2D devices.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS), and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, and 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

1. The General of UE-to-UE Communication (Device-to-Device Communication)

According to the present invention, UE-to-UE direct communication means a method of performing direct communication between user equipments without using a base station in a situation that a channel state between at least two user equipments is good or a situation that user equipments are neighboring to each other. In this case, although the user equipments exchange data with each other by direct communication, UE-to-UE communication associated with the present invention differs from such communication for exchanging data between user equipments without participation of a base station as Bluetooth communication, infrared rays communication and the like in that prescribed control information for UE-to-UE communication is provided by a base station. Meanwhile, in case of client cooperative communication, a user equipment B helping communication of other user equipments receives data a user equipment A intends to transmit to a base station and then transmits the received data to the base station. Moreover, the user equipment B receives data the base station intends to transmit to the user equipment A and then transmits the received data to the user equipment A. In doing so, uni- or bi-directional communication is performed between user equipments within a system bandwidth. Hence, the client cooperative communication can be regarded as one example of the UE-to-UE communication. The client cooperative communication may be applicable to a UL (uplink) transmission through cooperation between user equipments. And, the client cooperative communication may be applicable to a DL (downlink) transmission through cooperation between a base station and a user equipment, cooperation between base stations or cooperation between antennas of DAS (distributed antenna system).

As mentioned in the foregoing description, the user equipment A exchanges data and/or control information with the base station via the user equipment B but may be able to directly exchange data and/or control information with the base station depending on circumstances. In particular, the user equipment A can directly exchange data with the base station in consideration of a channel status of the base station and a channel status of the user equipment B. In doing so, the data and/or control information directly exchanged with the base station by the user equipment A may be identical to or different from the data and/or control information exchanged by the user equipment A with the base station via the user equipment B.

A wireless communication system may support both direct communication and client cooperative communication or either the direct communication or the client cooperative communication. In case that the wireless communication system supports both of the direct communication and the client cooperative communication, a message for requesting the direct communication may be identical to or different from a message for requesting the client cooperative communication. In case that the same message is used, the direct communication request or the client cooperative communication request can be identified by 1-bit indicator. Thus, the direct communication between user equipments or the client cooperative communication between user equipments can be interchangeably used with such a terminology as device-to-device (hereinafter abbreviated D2D) communication, MS-to-MS (mobile station-to-mobile station) communication, peer-to-peer (hereinafter abbreviated P2P) communication and the like. For clarity of the following description, the above-enumerated terminologies shall be commonly named 'D2D communication' to describe embodiments of the present invention. Moreover, in the present specification, 'D2D device' may mean a user equipment supportive of D2D communication.

Every node of the present invention except the D2D device shall be named a base station to describe the present invention. For instance, such a node as a relay node, an antenna node of DAS (distributed antenna system) and the like may be described in a manner of being named a base station in aspect of an access point for accessing the base station. Therefore, in case that communication with a base station is performed through a relay node and the like, the corresponding communication may be described as the communication between the D2D device and base station participating in D2D communication.

According to one of the major purposes of the D2D communication, D2D communication is performed in a manner that a direct link is established between D2D devices located in a short distance in-between or between D2D devices having a good channel status for directly connecting the D2D devices to each other, whereby power or radio resources can be saved in comparison with power or radio resources used for the communication between D2D devices via a base station.

FIG. 1 shows one example that D2D communication is performed between two D2D devices.

Referring to FIG. 1, D2D communication is performed between two D2D devices (i.e., Device A and Device B) located on a cell edge within the coverage of a base station for example. In doing so, when the D2D devices are located in a short distance on the cell edge, since a mutual direct link or channel state is better than a channel state with the base station, if the direct D2D communication is performed between the D2D devices, it can bring a considerable effect in saving a radio resource or power in comparison with an effect resulting from performing communication via a base station.

Thus, if the D2D communication is performed, data are mutually exchanged between the two D2D devices using resources (e.g., a frequency band, a subframe, a time slot, etc.) allocated to the two D2D devices. Eventually, in a situation that the D2D communication is performed between the D2D devices, the two D2D devices are identical to a femto cell eNB, a home 2NB or a CSG (closed subscriber group), of which capacity is 1. In this case, one of the big problems is a problem of interference possibly occurring between a device performing D2D direct communication and a device performing communication with a cellular network. In particular, the situation shown in FIG. 2 may occur.

Figure 2:
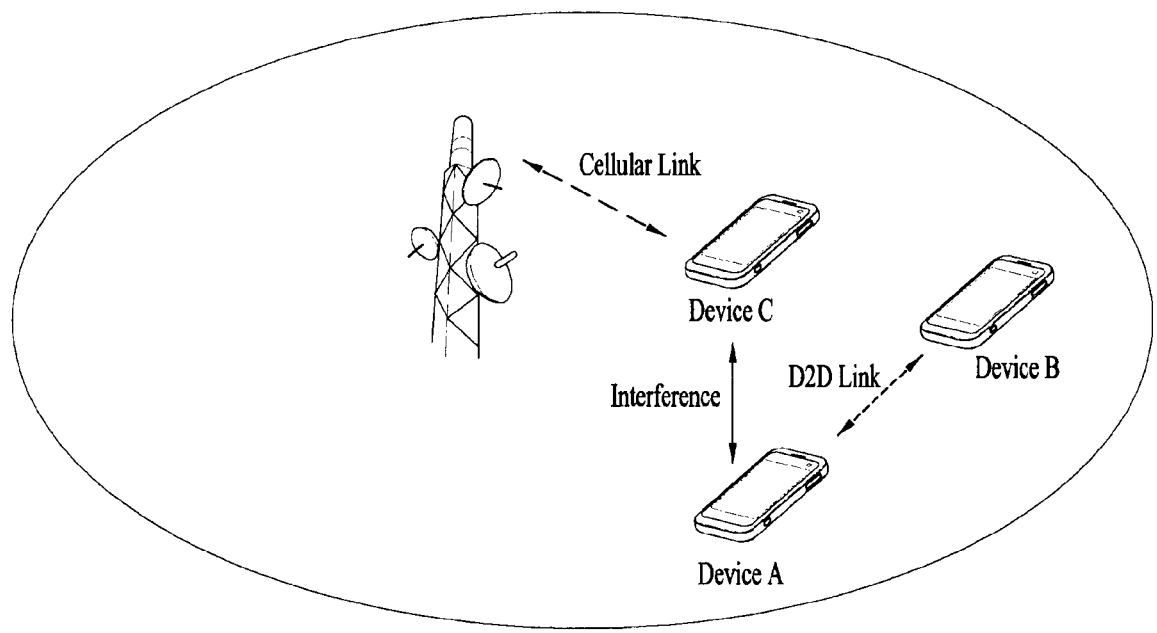
FIG. 2 shows one example of a case that interference occurs between a D2D device performing D2D communication and a device communicating with a cellular network.

FIG. 2 shows one example of a case that interference occurs between a D2D device performing D2D communication and a device communicating with a cellular network.

Referring to FIG. 2, D2D communication is performed between two D2D devices (i.e., Device A and Device B) and Device C performs communication with a cellular network (i.e., a base station), for example. In doing so, Device C is located nearby the D2D device (e.g., Device A or Device B). If Device C performs communication with the base station using the same resource as a radio resource used for the D2D communication between the D2D devices (e.g., Device A and Device), interference with the D2D device (e.g., Device A or Device B) performing the D2D communication. Namely, communication performance of both of the D2D device (e.g., Device A or Device B) performing the D2D communication and Device C may be lowered.

This problem may get considerably serious if the D2D device currently performing the D2D communication has mobility.

Figure 3:
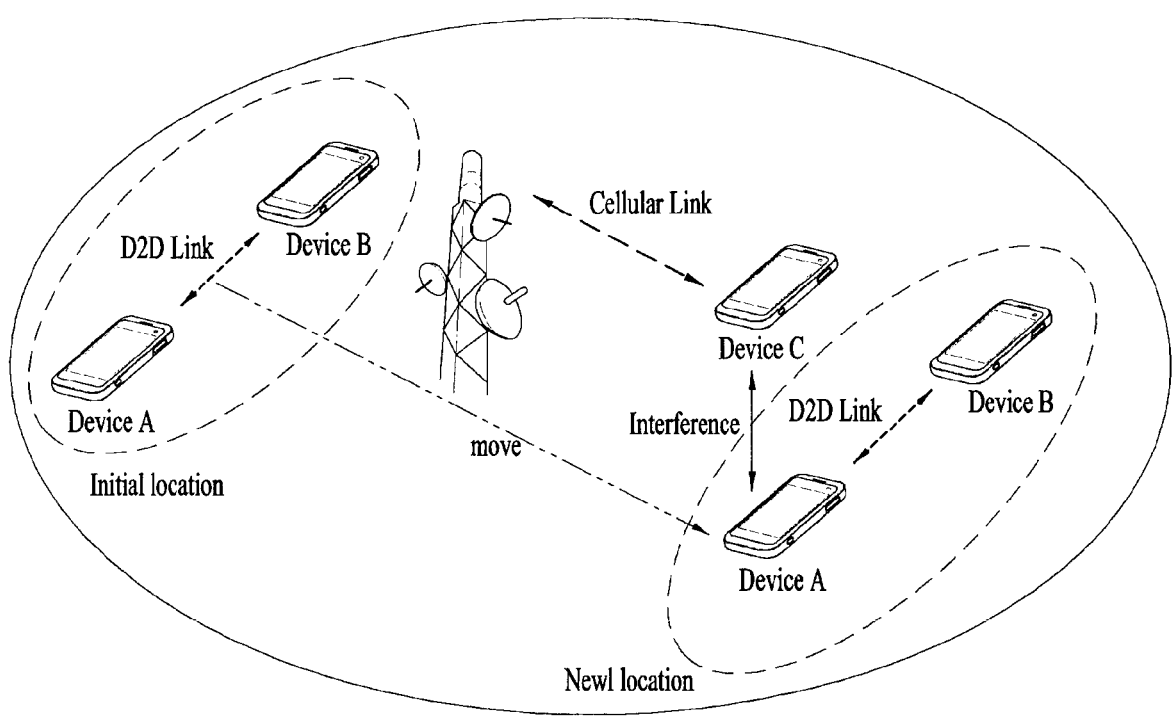
FIG. 3 shows one example of a case that interference occurs between a user equipment performing D2D communication and a user equipment communicating with a cellular network.

FIG. 3 shows one example of a case that interference occurs between a user equipment performing D2D communication and a user equipment communicating with a cellular network.

Referring to FIG. 3, while two D2D devices (i.e., Device A and Device B) are performing D2D communication and Device C is performing communication with a cellular network (i.e., a base station), the two D2D devices (i.e., Device A and Device B) are moving toward Device C, for example. Thus, if the D2D devices currently performing the D2D communication are moving, if a radio resource is initially allocated to the D2D devices for the D2D communication, although the radio resource does not interfere with other device currently communicating with the cellular network, the corresponding radio may cause interference with other device currently communicating with the cellular network and performance degradation may be caused to both of the D2D device currently performing the D2D communication and then device currently performing the cellular communication.

Thus, if the D2D device performing the D2D communication has mobility, it is important for the D2D devices performing the D2D communication to persistently check a state of a link and update availability of radio resources other than a currently used radio resource in order to perform effective resource allocation and interference management within a system. Moreover, it is also important for the D2D device performing the D2D communication to inform a base station of its current information periodically in order to enable the base station to efficiently allocate a resource to a device belonging to the cellular network.

2. Resource Allocation Method for D2D Communication

In the following description, a method of allocating resources used for D2D communication using information transceived between a D2D device and a base station according to the present invention is proposed. Moreover, for clarity of the following description, as information that can be considered by a base station or D2D device to reallocate a resource used for D2D communication causing interference with other device due to the D2D communication, information mutually exchanged between the base station and the D2D device shall be named 'resource control information'.

Figure 4:
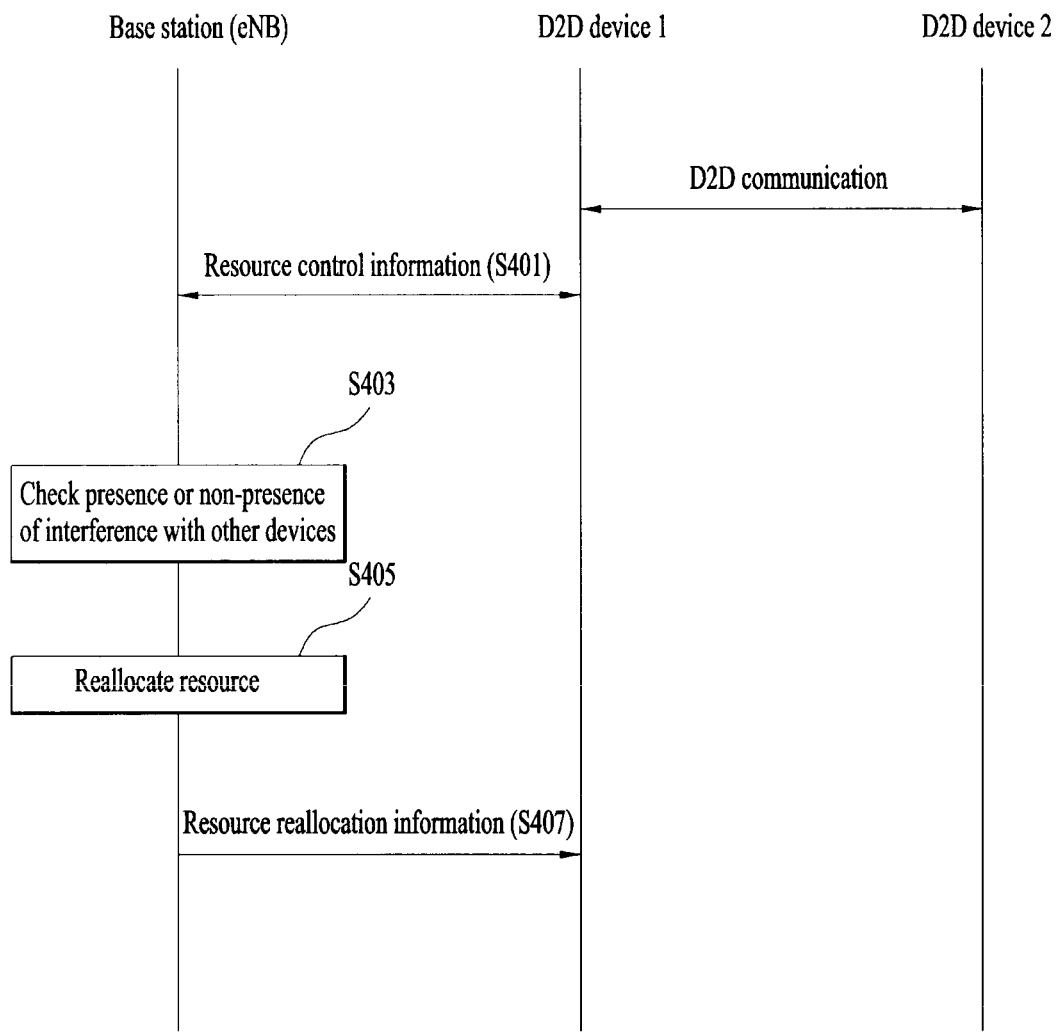
FIG. 4 shows a method of allocating a resource for D2D communication using resource control information in a base station according to one embodiment of the present invention.

FIG. 4 shows a method of allocating a resource for D2D communication using resource control information in a base station according to one embodiment of the present invention.

Referring to FIG. 4, while D2D device 1 and D2D device 2 are performing D2D communication with each other in a cellular network system, a base station (eNB) exchanges resource control information with the D2D device 1 [S401]. And, the resource control information exchanged between the base station and the D2D device 1 shall be explained in detail in the description of '2. 1. 1.'. Meanwhile, although FIG. 4 shows that only the D2D device 1 transceives the resource control information with the base station for clarity of the following description, each of the D2D device 1 and the D2D device 2 may be able to transceive the resource control information with the base station.

Using the resource control information exchanged with the D2D device, the base station checks whether interference with a device performing communication with a neighbor cellular network or other devices performing D2D communication occurs [S403]. In this case, using mobility information, coordination information or the like of the D2D device 1 or the D2D device 2, the base station may be able to estimate whether interference will occur in the future despite not occurring currently.

Having checked that the interference with other neighbor device or estimated that the interference with other neighbor device will occur in the step S403, the base station cancels a radio resource allocated between the D2D device 1 and the D2D device 2 and then reallocates other radio resource determined as not causing interference [S405].

Subsequently, the base station transmits information on the reallocated radio resource to the D2D device [S407]. In this case, for clarity of the description, FIG. 4 shows that the information on the reallocated radio resource is transmitted to the D2D device 1 only. Yet, the base station may be able to transmit the information on the reallocated radio resource to each of the D2D device 1 and the D2D device 2.

Thus, using the resource control information transceived with a D2D device performing D2D communication, in case that interference between the corresponding D2D device and a device currently performing communication with a cellular network or other device currently performing D2D communication, a base station can reallocate a radio resource for the D2D communication to the corresponding D2D device. On the other hand, according to an embodiment mentioned in the following description, a D2D device performing D2D communication can reallocate a resource allocated by a base station.

Figure 5:
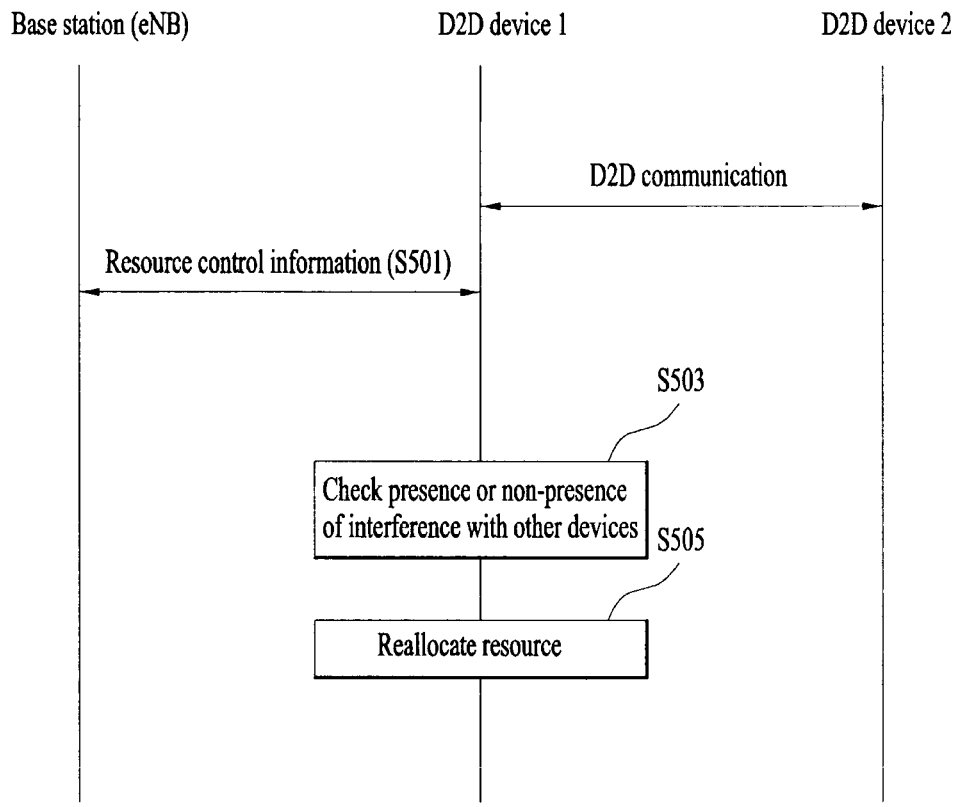
FIG. 5 shows a method of allocating a resource for D2D communication using resource control information in a D2D device according to one embodiment of the present invention.

FIG. 5 shows a method of allocating a resource for D2D communication using resource control information in a D2D device according to one embodiment of the present invention.

Referring to FIG. 5, while D2D device 1 and D2D device 2 are performing D2D communication with each other in a cellular network system, the D2D device 1 exchanges resource control information with a base station (eNB) [S501]. And, the resource control information exchanged between the D2D device 1 and the base station shall be explained in detail in the description of '2. 1. 1.'. Meanwhile, although FIG. 5 shows that only the D2D device 1 transceives the resource control information with the base station for clarity of the following description, each of the D2D device 1 and the D2D device 2 may be able to transceive the resource control information with the base station.

Using the resource control information exchanged with the base station, the D2D device checks whether interference with a device performing communication with a neighbor cellular network or other devices performing D2D communication occurs [S503]. In this case, using mobility information, coordination information or the like of the D2D device 1 or the D2D device 2, the D2D device 1 may be able to estimate whether interference will occur in the future despite not occurring currently.

Having checked that the interference with other neighbor device or estimated that the interference with other neighbor device will occur in the step S503, the D2D device allocates a radio resource that replaces the former radio resource for the D2D communication [S505]. In particular, the D2D device 1 stops using the resource allocated for the D2D communication by the base station and then uses another radio resource, which is determined as not causing interference, for the D2D communication. In more particular, the D2D device having received the allocation of the radio resource for the D2D communication can perform the D2D communication using the allocated resource entirely or in part. In case of using the allocated resource entirely for the D2D communication, it is able to change it into another unallocated radio resource. In case of using the allocated resource in part for the D2D communication, it is able to change it into another resource within the allocated resource. In doing so, if the D2D device determines to use another radio resource for the D2D communication, the D2D device 1 can transmit information on the radio resource intended to use to the base station and/or the D2D device 2, which is not shown in FIG. 5.

2. 1. Resource Control Information Exchange between Base station and D2D Device

At least one of D2D devices currently performing D2D communication can transceive control information with a base station. In this case, the control information transceived between the D2D device and the base station and a channel for transceiving this information are described as follows.

2. 1. 1. Resource Control Information

A base station can transmit the following resource control information to at least one of D2D devices currently performing D2D communication.

1) Information transmitted by a base station to at least one of D2D devices currently performing D2D communication can include information on a resource of a corresponding sector or cell. In particular, the information may include information on a resource (e.g., a frequency bandwidth, etc.) used nearby a D2D communication performed cell, sector or D2D devices.

In this case, the information on the resource can be represented as 0 or 1 using a bit to indicate whether the resource is used. For instance, '0' may indicate an unused resource, while '1' may indicate a currently used resource or a resource in use. In this case, a radio resource is divided by a channel unit (frequency or time) assigned for each device performing communication with a cellular network or each D2D device performing D2D communication. And, it is able to represent information indicating whether each divided radio resource is used.

Moreover, it is able to indicate whether a corresponding radio resource is used in a cellular network or for D2D communication. In this case, a radio resource is divided by a channel unit (frequency or time) assigned for each device performing communication with a cellular network or each D2D device performing D2D communication. And, it is able to represent information indicating whether each divided radio resource is used. In this case, it is a matter of course that both of the information indicating the radio resource is used for the cellular network or the D2D communication and the information indicating whether the radio resource is used can be represented together.

2) Information transmitted by a base station to at least one of D2D devices currently performing D2D communication can include information on a channel between a base station and two D2D devices currently performing the D2D communication. In particular, for example, the information may include MCS (modulation and coding scheme), power control, pathloss, SNR (signal t noise ratio), SINR (signal to interference-plus-noise ratio) and the like, by which the present invention may be non-limited.

If one of the two D2D devices currently performing D2D communication received channel information from the base station only, since the D2D device receiving the channel information from the base station can directly estimate a channel state with the base station, the channel information transmitted by the base station may include the channel information between the base station and a counterpart D2D device currently performing the D2D communication with the corresponding D2D device instead of the D2D device directly receiving the channel information from the base station. For instance, while D2D device A and D2D device B are performing D2D communication, if the D2D device A receives channel information from a base station only, the corresponding channel information may mean the channel information between the D2D device B and the base station only.

3) Information transmitted by a base station to at least one of D2D devices currently performing D2D communication can include mobility or coordinates (position) information of a counterpart D2D device currently performing the D2D communication. A base station can check the coordinates or mobility information of the counterpart D2D device using LBS (location based signal).

In this case, the mobility information may indicate an accurate speed or may indicate a moving direction and speed extent of the counterpart D2D device as a step (or level) instead of the accurate speed. For instance, the moving direction divides all directions into 8 directions and can represent the 8 directions as 3 buts. When the D2D device keeps still, the speed extent can be represented as 0. A speed of walking speed information can be represented as 1. And, higher speeds can be represented as 2. Thus, the speed extent can be represented as total 2 bits. In this case, thresholds/critical values indicating boundary values of the respective steps for discriminating the moving direction or speed step by step can be determined in advance and may differ per base station or cell.

Moreover, the information on the speed may be transmitted in association with an update cycle of a channel state. For instance, the information can be transmitted in a following manner. First of all, in a still state, which does not need to update channel information, a value of the speed is set to 0. Secondly, if the speed value increases up to 1 to 3, the update cycle of the channel information can decrease. Namely, the base station can deliver the speed information of the counterpart D2D device to correspond to a case that the update cycle of the channel state of the counterpart D2D device gets shortened.

4) Channel information among informations transmitted by a base station to at least one of D2D devices currently performing D2D communication may be transmitted to the corresponding D2D device by the base station only if the coordinates value of the corresponding device mentioned in the foregoing description of '3)' varies over a predetermined level or the mobility value of the corresponding D2D device is equal to or greater than a predetermined value. Such a determination may be made by the base station or in response to a request made by the D2D device.

On the other hand, at least one of D2D devices currently performing D2D communication can transmit the following resource control information to a base station.

1) Information transmitted to a base station by at least one of D2D devices currently performing D2D communication may include information of a channel quality between the D2D devices performing the D2D communication. In this case, the channel quality information between the D2D devices can be represented as an accurate value. For instance, the channel quality information may include a signal to noise ratio (SNR), a signal to interference noise ratio (SINR), a bit error rate (BER), a frame error rate (FER) and the like, by which the present invention may be non-limited.

2) Information transmitted to a base station by at least one of D2D devices currently performing D2D communication may include a total size of data transmitted by the at least one D2D device to a counterpart D2D device using the D2D communication.

3) Information transmitted to a base station by at least one of D2D devices currently performing D2D communication may include information indicating a remaining battery level of the corresponding D2D device or a presence or non-presence of connection to an external power. In this case, the D2D device can express the battery remaining level as a rate. And, the information may indicate a level corresponding to one of a plurality of levels resulting from dividing the rate.

2. 1. 2. Channel for Transceiving Resource Control Information

The information exchanged between a base station and a D2D device, which is explained in the former description '2. 1. 1.', can be transceived on the following channels.

1) The mutual information exchange between a D2D device currently performing D2D communication and a base station can be performed in a manner of transceiving information through control channels (i.e., an uplink control channel and a downlink control channel). For instance, in 3GPP LTE/LTE-A system, a communication from a D2D device to a base station (BS) may be performed through a physical uplink control channel (PUCCH), while a communication from the BS to the device may be performed through a physical downlink control channel (PDCCH).

2) The mutual information exchange between a D2D device currently performing D2D communication and a base station can be performed in a manner of transceiving information through a control channel separately designed for the exchange. In this case, a new control channel may be included in a region of an existing PDCCH or PUCCH.

3) The mutual information exchange between a D2D device currently performing D2D communication and a base station can be performed in a manner of transceiving information through a control channel separately designed for the exchange. In this case, a new control channel may be located at a foremost part of a subframe. For instance, in 3GPP LTE/LTE-A system, the new control channel may be located on a frequency region having PCFICH (physical control format indicator channel) not assigned thereto in a $1^{st}$ OFDM (orthogonal frequency division multiplex) symbol, which carries an existing PCFICH, of a subframe.

4) In case that a D2D device currently performing D2D communication transmits information to a base station, the D2D device can transmit the information through a physical uplink shared channel (PUSCH) region. In particular, the D2D device can transmit the information in a manner of piggybacking or multiplexing control data on the PUSCH region. In this case, a transmission format of the information can use the same method of transmitting UCI (uplink control information) on PUSCH only without data.

5) In case that a base station transmits information to a D2D device currently performing D2D communication, the base station can transmit the information through an enhanced/evolved physical downlink control channel (e-PDCCH) region. In this case, the e-PDCCH means a channel transmitted in a manner of being multiplexed with PDSCH in a PDSCH region for the capacity enhancement of an existing PDCCH in 3GPP LTE/LTE-A system. In particular, information on the e-PDCCH region and additional information are transmitted on an existing legacy PDCCH region. Based on this, additional information can be transmitted through the e-PDCCH region. In doing so, in order to transmit the information on the e-PDCCH region and the additional information through the legacy PDCCH region, a partial region can be used. For example, 1 CCE (control channel element) can be used.

2. 2. Case that D2D Device Currently Performing D2D Communication Moves Away into Another Cell In case that a D2D device has mobility, if D2D devices performing D2D communication starts an initial D2D communication, they exist in a single same cell. Yet, the D2D devices performing the D2D communication may possibly belong to different cells in the course of performing the D2D communication while maintaining a D2D communication link. In particular, as one of the D2D devices performing the D2D communication moves away into a cell managed or serviced by a different base station, the D2D devices may belong to different cells, respectively. In doing so, the D2D devices can be aware that each of the D2D devices belongs to a cell serviced by a specific base station in a manner of exchanging information by the mutual D2D communication or through a base station. Thus, if the D2D devices currently performing the D2D communication belong to different cells, respectively, the following operations can be performed to transceive the informations explained in the description '2. 1.' between the base station and the D2D device.

1) If a prescribed one of D2D devices currently performing D2D communication moves away into a cell serviced by a different base station only, the D2D devices stop the D2D communication and can maintain the mutual communication by changing a communication system into a cellular network. In doing so, each of the D2D devices can use a base station that services the corresponding D2D device located cell and can transceive the aforementioned informations through a control channel with the corresponding base station.

2) When a prescribed one of D2D devices currently performing D2D communication moves away into a cell serviced by a different base station only, if an offset is applied to a threshold for determining an inter-cell handover, the D2D device moving away into the different cell can operate as if belonging to a cell serviced by an existing cell before moving. In particular, even if the corresponding D2D device receives a signal having a quality equal to or smaller than a threshold for determining an existing handover from the existing base station, the corresponding D2D device can operate as if belonging to the cell serviced by the existing base station. Eventually, by adjusting a threshold value of a link quality for a handover, it is able to obtain an effect of expanding a cell range. Therefore, the D2D devices currently performing the D2D communication can operate as if performing the D2D communication by belonging to the same cell.

3) If a prescribed one of D2D devices currently performing D2D communication moves away into a cell serviced by a different base station only, the D2D device having moved away into the cell service by the different cell can receive necessary control information from a base station through a D2D device remaining in an existing cell. In particular, all communications with the base station can be performed through a counterpart D2D device remaining in a cell serviced by the existing base station. In doing so, in order to transceive control information from a base station between D2D devices, it is able to use a channel separate from that of data. For example, the separate channel may include a control channel used for an existing cellular network, by which the present invention may be non-limited.

4) If a prescribed one of D2D devices currently performing D2D communication moves away into a cell serviced by a different base station only, each of the D2D devices can transceive control information with a base station to which the corresponding D2D device belongs. Unlike the former case that each of the D2D devices changes a communication system into a cellular network in the description '1)', each of the D2D devices can transceive control information with a base station to which the corresponding D2D device belongs by maintaining the mutual D2D communication. Moreover, in doing so, a resource used for the direct communication between two D2D devices can be reconfigured in consideration of situations of both base stations. For instance, it is able to consider such a situation as a radio resource available for both base stations, a radio resource possibly interfering with a different cellular device and the like.

3. The General of Device for Implementing the Present Invention

Figure 6:
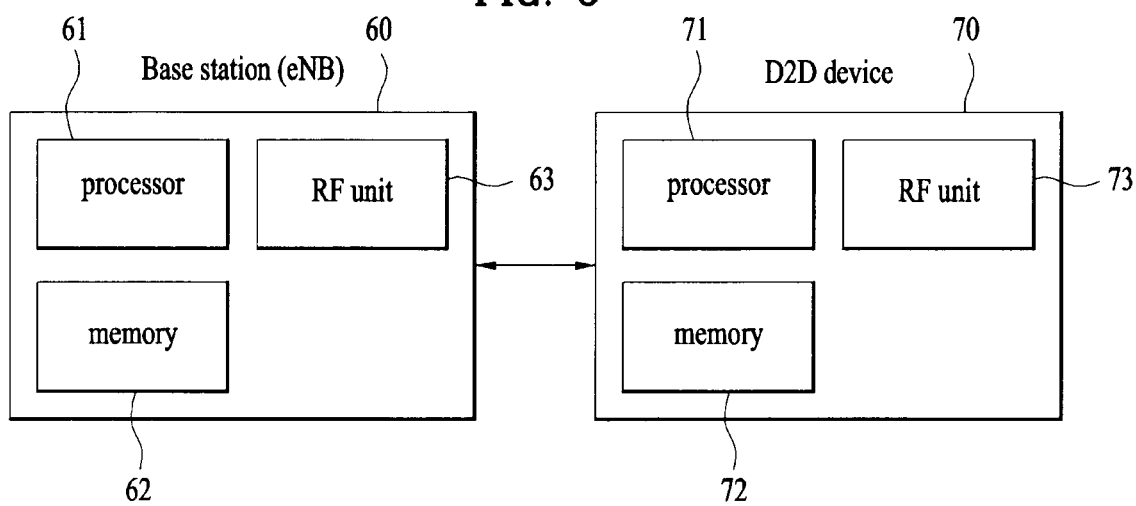
FIG. 6 is a block diagram for a configuration of a wireless communication device according to one embodiment of the present invention.

FIG. 6 is a block diagram for a configuration of a wireless communication device according to one embodiment of the present invention.

Referring to FIG. 6, a wireless communication system may include a base station BS 60 and a plurality of D2D devices 70 located within an area of the base station 60.

The base station 60 may include a processor 61, a memory 62 and an RF (radio frequency) unit 63. The processor 61 implements the proposed functions, processes and/or methods. Layers of a radio interface protocol can be implemented by the processor 61. The memory 62 is connected with the processor 61 and then stores various kinds of information to drive the processor 61. The RF unit 63 is connected with the processor 61 and then transmits and/or receives radio signals.

The D2D device 70 includes a processor 71, a memory 72 and an RF unit 73. The processor 71 implements the proposed functions, processes and/or methods. Layers of a radio interface protocol can be implemented by the processor 71. The memory 72 is connected with the processor 71 and then stores various kinds of information to drive the processor 71. The RF unit 73 is connected with the processor 71 and then transmits and/or receives radio signals.

The memory 62/72 may be provided within or outside the processor 61/71. And, the memory 62/72 may be connected with the processor 61/71 via various kinds of well-known means. Moreover, the base station 60 and/or the D2D device 70 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although a data transceiving method in a wireless access system according to the present invention is described with reference to examples applied to 3GPP LTE system, it may be applicable to various kinds of wireless access systems as well as the 3GPP LTE system.

What is claimed is:

1. A method of allocating a radio resource, which is used for device-to-device (D2D) communication in a wireless access system supportive of the D2D communication, the method, performed in a first device, comprising:
   receiving resource control information through a control channel from a base station while the first device performs the D2D communication with a second device; and
   allocating a radio resource, based on the resource control information, for the D2D communication between the first device and the second device;
   wherein the allocation of the radio resource does not cause interference with a third device,
   wherein the resource control information for the D2D communication is transmitted through an e-PDCCH (enhanced Physical Downlink Control Channel), and additional information on the e-PDCCH is transmitted through a legacy PDCCH with a size of one CCE (control channel element), and
   wherein the resource control information for the D2D communication includes speed information on the second device and moving direction information on the second device.

2. The method of claim 1, wherein the resource control information comprises at least one selected from the group consisting of a resource use information on the radio resource of a cell or sector having the D2D communication between the first device and the second device performed therein, a channel quality information between the second device and the base station, and a coordinates (position) information of the second device.

3. The method of claim 2, wherein the resource use information comprises one of an information indicating whether the radio resource of the cell or the sector is used and an information indicating whether the radio resource of the cell or the sector is used for a communication with a cellular network or the D2D communication.

4. The method of claim 2, wherein the channel quality information is transmitted when the mobility information of the second device or the coordinates (position) information of the second device is changed over a predetermined level.

5. The method of claim 2, wherein each of the moving direction information and the speed information is divided by steps.

6. The method of claim 1, wherein the radio resource is allocated in a manner of allocating the radio resource configured not to cause the interference with the third device using a channel quality information with the second device.

7. The method of claim 1, wherein the control channel is transmitted in a foremost OFDM (orthogonal frequency division multiplex) symbol of a subframe.

8. An apparatus for allocating a radio resource, which is used for device-to-device (D2D) communication in a wireless access system supportive of the D2D communication, the apparatus comprising:
   an RF (radio frequency) unit configured to transceive radio signals; and
   a processor which is configured to:
   receive a resource control information through a control channel from a base station while performing the D2D communication with a second device, the processor; and
   allocate a radio resource, based on the resource control information, for the D2D communication between the first device and the second device,
   wherein the allocation of the radio resource does not cause interference with a third device, wherein the resource control information for the D2D communication is transmitted through an e-PDCCH (enhanced Physical Downlink Control Channel), and additional information on the e-PDCCH is transmitted through a legacy PDCCH with a size of one CCE (control channel element), and wherein the resource control information for the D2D communication includes speed information on the second device and moving direction information on the second device.

9. The apparatus of claim 8, wherein the resource control information comprises at least one selected from the group consisting of a resource use information on the radio resource of a cell or sector having the D2D communication between the first device and the second device performed therein, a channel quality information between the second device and the base station, and a coordinates (position) information of the second device.

10. The apparatus of claim 9, wherein the resource use information comprises one of an information indicating whether the radio resource of the cell or the sector is used and an information indicating whether the radio resource of the cell or the sector is used for a communication with a cellular network or the D2D communication.

11. The apparatus of claim 9, wherein the channel quality information is transmitted when the mobility information of the second device or the coordinates (position) information of the second device is changed over a predetermined level.

12. The apparatus of claim 9, wherein each of the moving direction information and the speed information is divided by steps.

13. The apparatus of claim 8, wherein the processor allocates the radio resource configured not to cause the interference with the 3rd device using a channel quality information with the second device.

14. The apparatus of claim 8, wherein the control channel is transmitted in a foremost OFDM (orthogonal frequency division multiplex) symbol of a subframe.

* * * * *